June 10, 1930.  M. P. DE MOTTE ET AL  1,762,260
CUTTING AND WELDING APPARATUS
Filed Nov. 4, 1921
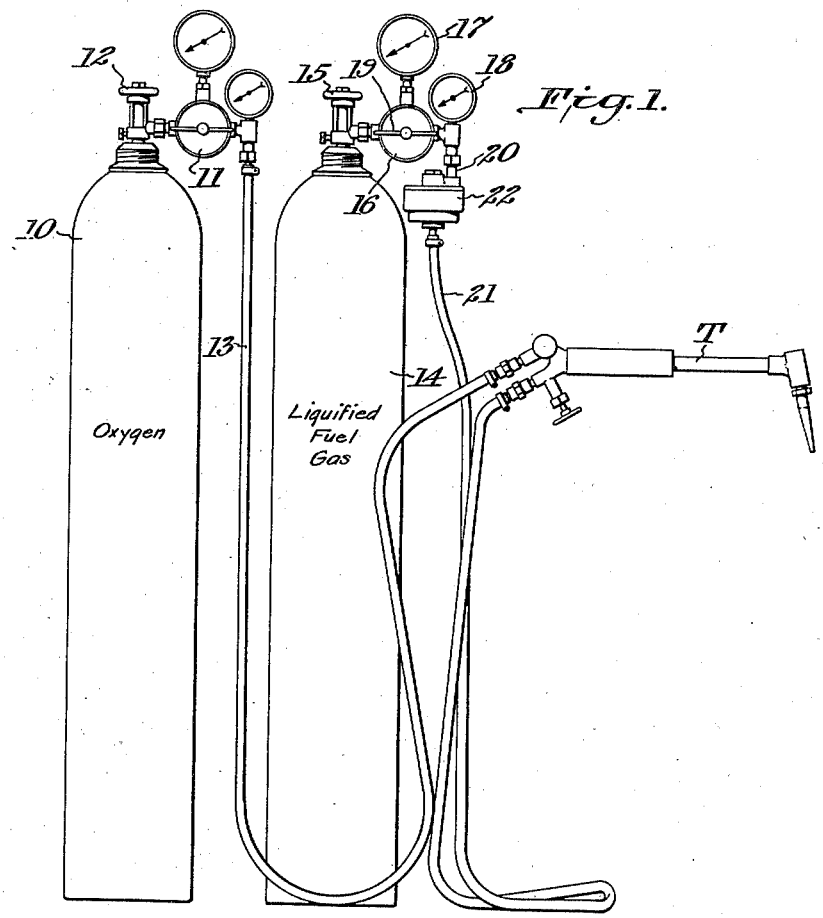
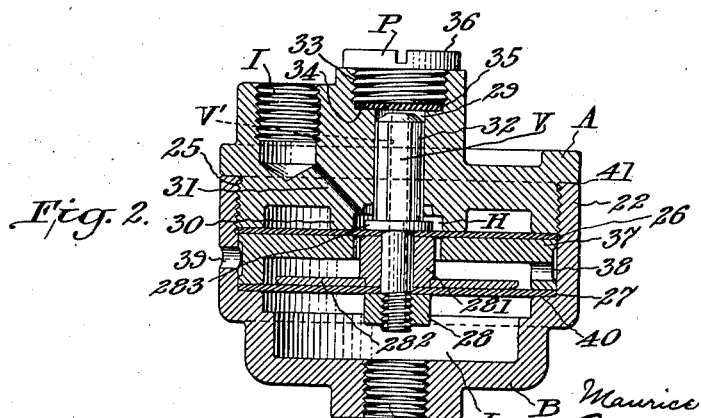

Patented June 10, 1930

1,762,260

UNITED STATES PATENT OFFICE

MAURICE P. DE MOTTE, OF BUFFALO, AND RAYMOND C. PIERCE, OF NEW YORK, N. Y., ASSIGNORS TO THE LINDE AIR PRODUCTS COMPANY, A CORPORATION OF OHIO

CUTTING AND WELDING APPARATUS

Application filed November 4, 1921. Serial No. 512,885.

This invention relates to improvements in metal cutting and welding apparatus utilizing gases under pressure, and more particularly to such apparatus in which the fuel gas employed is in a liquid state in the usual storage cylinder.

For cutting and welding metals it has been found advantageous to use various hydrocarbon fuel gases which, under cylinder pressures and atmospheric temperatures, exist as liquids in the storage cylinder. Such hydrocarbon gases are desirable because they not only have the requisite flame temperatures and high number of heat units per cubic foot but also, since they liquefy readily, a great number of heat units may be stored in a given size cylinder thereby reducing the investment in cylinders and the cost of freight and handling of the gas to the user.

Cylinders of liquefied gases of the kind referred to above have been equipped with the usual regulating valves employed on compressed gas cylinders, such valves being designed to deliver gas at the low pressure at which they are set regardless of the pressure in the cylinder. It has been found that such valves, which when applied to most compressed-gas cylinders give a nearly constant pressure on the exit side, do not operate successfully with liquefied gases of the kind referred to. Instead of being nearly constant the pressure at which the gas is delivered is subject to sharp fluctuations, resulting in frequent extinguishing of the flames and variations in the character of the flame, which is fed with oxygen at a constant rate and should have an equally constant supply of fuel gas. The cause of these fluctuations has not been adequately explained but the fluctuations are found to be more troublesome in cold weather.

A principal object of this invention is to provide means to be used in combination with a container of liquefied gas and a regulating valve, so that the fluctuations of the pressure of the gas delivered by the combination will be held within such limits that the torch to which gas is supplied will function properly.

The pressure fluctuations in the gas delivered from the regulating valve are found to be almost independent of the pressure for which this valve is set. If this valve is set for 5 pounds and the conditions are such that the actual pressure fluctuates from nearly zero to about 5 pounds, the actual pressure will be found to vary from about 45 pounds to about 50 pounds if the valve is set to deliver at 50 pounds, other conditions remaining the same. That is to say, the range of variation is about 5 pounds in either case.

If the low-pressure side of the regulating valve is connected to a device which reduces gas-pressure to a constant fraction of its original value, it will be apparent that fluctuations at the torch, beyond this device, can be much reduced. If only a regulating valve is used and it is set at 5 pounds, and the range of variation is that assumed above, the actual pressure at the burner may vary from zero to 5 pounds and very unsatisfactory operation will result. If, on the other hand, the regulating valve is set at 50 pounds, and delivers gas at 45 to 50 pounds, and an additional device capable of reducing the pressure to one-tenth its original value is connected to the regulating valve, final actual pressures within the range 4.5 to 5 pounds will be obtainable, and the operation of the torch will be greatly improved.

The above object of our invention is attained by the use of a constant-ratio reduction device in combination with the torch, container of liquefied gas, and regulating valve as indicated above.

Another object of this invention is to provide a cutting and welding apparatus of the aforesaid type in which the fluctuation dampening means is simple, requires no special adjustment by the operator, always has ample gas passage area that will not become clogged, and is light and so arranged as to exert a minimum over-turning effect on the upright cylinder of liquefied gas with which it is combined.

A further object of the invention is to provide an improved constant-ratio pressure reducing valve, which will effectively dampen the pressure fluctuations referred to.

The above and other objects and the novel features of the invention will be apparent from the following description taken in connection with the accompanying drawing, in which Fig. 1 is a view illustrating a metal cutting apparatus embodying the present invention, and Fig. 2 is a central sectional view of an improved constant-ratio pressure reducing valve, embodying this invention.

Generally speaking, the invention comprises a metal cutting or welding apparatus, consisting of a suitable cutting or welding blowpipe connected by a suitable hose or other conduit to the low pressure side of the usual regulating valve of an oxygen cylinder, and a cylinder of liquefied fuel gas that is adapted to supply fuel gas through its usual pressure regulating valve to an improved constant-ratio pressure reducing valve and from the latter through a suitable hose or conduit to the blowpipe. The invention is especially applicable to metal cutting apparatus of the class described, and illustrated, but is of more general application. The improved pressure reducing valve is desirably constructed and adjusted to work at a predetermined ratio of pressures so as to proportionally dampen the fluctuations of pressure caused by the interruptions of gas flow through the usual regulating valve. The improved valve is light and located substantially within the general plan outline of the fuel cylinder and its usual equipment, so that it will not materially increase the top-heaviness of the fuel cylinder, which latter is necessarily kept standing up at a steep enough angle to prevent the liquefied gas from passing as a liquid into the regulating valve.

A typical apparatus embodying the present invention is illustrated in Fig. 1, in which the usual oxygen cylinder 10 has mounted thereon a pressure regulating valve 11 of a well-known type, having the usual high and low pressure gauges and adjusting handle. The oxygen cylinder also has a valve 12 to control the flow of oxygen from the cylinder through the regulating valve and hose connection or other conduit 13, to the cutting blowpipe or torch T. The cylinder 14 adapted to contain a liquefied fuel gas, such as a liquefied hydrocarbon gas under pressure, is also provided with a control valve 15 of the usual type that controls the flow of gas into a pressure regulating valve 16 of the usual type, having the high pressure gauge 17, the low pressure gauge 18, the adjusting handle 19 and a coupling means 20 at the low pressure side of the valve. Heretofore, where compressed fuel gases in a gaseous state have been employed, a fuel supply hose 21 for the blowpipe T has been coupled to the low pressure side of the regulating valve by the coupling 20. Also, it has been proposed to couple an additional standard type pressure regulating valve to the first regulating valve and between the coupling 20 and the hose or conduit 21, but this arrangement has been found to be impractical because the second regulating valve must be many times larger than the first, due to the great reduction in pressure and the increase in volume of the gas reaching it. Since the terminal pressure of the second valve is kept substantially constant, the pressure reduction is not in a substantially constant ratio as is necessary to minimize pressure fluctuations. Other impractical features of a second standard regulating valve are the fact that the top-heaviness of the liquefied fuel cylinder is prohibitively increased, and that the operator has additional valve adjustments to make, which is very undesirable.

According to the present invention and as illustrated in Fig. 1, a constant-ratio pressure reducing valve 22 is connected in the gas line between the usual pressure regulating valve 16 and the blowpipe T, and the inlet side of the valve 22 is coupled to the coupling 20 at the low pressure side of the usual pressure regulating valve 16, and the outlet side of the valve 22 is connected to the gas hose 21. The valve 22 is so constructed and arranged as to project inwardly toward the cylinder and is disposed substantially within the plan outline of the valve 16. The improved valve will thus be close to the vertical axis of the cylinder so that the overturning tendency of the combination will not be materially increased. The improved valve is initially adjusted to a predetermined ratio of reduction of pressure and requires no special adjustment by the operator, as in the case of the usual regulating valve. For a given setting of regulating valve and the blowpipe valves, the constant-ratio reducing valve will therefore reduce the pressure at a substantially constant ratio and will also dampen the pressure fluctuations at substantially the same ratio. The gas passages of this valve may be of relatively large diameter to avoid clogging. It is necessary to keep the liquefied fuel containing cylinders standing at a steep enough angle to prevent the liquid gas from passing into the regulating valve, but this is difficult on the uneven ground often encountered in the yards of industrial plants where the welding and cutting apparatus is used. Accordingly, it is important that the valve 22 be located close to the axis of the fuel cylinder, as illustrated, to reduce the top-heaviness of the cylinder. Unless the cylinders are kept standing up, the liquid gas flowing therefrom vaporizes in the regulating valve and interferes with or prevents its operation.

A constant-ratio pressure reducing valve especially adapted for use as the valve 22 in the apparatus disclosed in Fig. 1, is illustrated in section in Fig. 2 and comprises a casing consisting of two metal members A and B, detachably coupled together by screw-threads 25 and hollowed out to provide a pressure chamber between them. The member A is provided with an eccentric gas inlet I and the member B has a concentric gas outlet O. By reason of this eccentric position of the inlet I, the valve may be coupled to the regulating valve 16 and adjusted inwardly toward the axis of the cylinder as desired, so that the valve 22 will not materially increase the top-heaviness of the cylinder. The flow of gas through the pressure chamber from the high pressure chamber H to the low pressure chamber L is controlled by the valve V that is coupled to the high pressure diaphragm 26 and the low pressure diaphragm 27, and operates in response to the differential pressure on these diaphragms which are desirably of flexible material such as single-ply diaphragm rubber. The valve V may be a hollow stem provided with a gas passage V' in line with the outlet O. A screw-threaded portion projects through central openings in the diaphragms 26 and 27, and is engaged by a nut 28 which clamps the diaphragms, an intermediate bushing 281, and a plate 282 between said nut and a shoulder 283 on said valve stem. A part of the valve stem V projects into a valve stem chamber 29 in the casing member A, such chamber 29 communicating with the high pressure chamber H formed by the diaphragm 26 and an annular boss 30 on the inner wall of the casing member A. A gas passage 31 connects the inlet I and the high pressure chamber H, and grooved or flattened portions extending along the valve stem form passages 32 adapted to admit gas from the high pressure chamber H to the valve passage V'. The casing member A has a threaded recess 33 concentric with the valve chamber but of larger diameter, providing a shoulder 34, upon which an imperforate valve seat 35 of rubber, leather or the like, is secured by a plug 36 that screws into the recess 33. The fixed valve seat 35 cooperates with the entrance end of the passage V' to control the flow of fluid through the latter, as the valve member V is moved against and away from the seat 35 by the diaphragms 26 and 27. A spacer 37 is disposed between the diaphragms 26 and 27 and is provided with a circumferential groove 38 that communicates with the space between the diaphragms, and a relief port 39 is provided in the casing member B through which any gas escaping from the high or low pressure chambers may escape, and so that the space between the diaphragms 26 and 27 may be maintained at atmospheric pressure. The casing member B has a shoulder 40 that abuts against the low pressure diaphragm 27 and holds the latter against the spacer 37, which in turn presses the high pressure diaphragm 26 against the casing member A and the boss 30. The arrangement is such that when the casing members A and B are secured together with their metal faces abutting at 41, the diaphragms and associated parts will be clamped together the proper amount to hold them at the correct compression.

Briefly, the operation of the valve 22 is substantially as follows: Gas entering the inlet I and passage 31 to the high pressure chamber H, flows through the passages 32 and V', into the low pressure chamber L, from which it is delivered through the outlet O to the hose 21. The working areas of the diaphragms 26 and 27 may be in any ratio desired, and if they are say one to ten, the reduction of pressure in this valve will always be substantially a ten to one reduction, and the variations in pressure in the high pressure side of the valve, which corresponds to the variation in pressure of the low pressure side of the usual pressure regulating valve, will be divided by ten when they reach the low pressure chamber L and will therefore not seriously interfere with the operation of the blowpipe. When the pressure in the chamber L rises, the diaphragm 27 will force the valve V toward its seat and close off the gas supply more or less until the proper ratio of pressure reduction for which this valve is adjusted, is again restored.

The improved apparatus and valve disclosed herein render it possible to efficiently operate gas cutting and welding blowpipes utilizing the gas obtained from cylinders of liquefied fuel gas and while the apparatus disclosed has special advantages, the general arrangement and the particular construction of the constant ratio pressure reducing valve may be modified without departing from the spirit of the invention. Furthermore, while the invention has been described in connection with liquefied gases, and is especially adapted for use in this connection, good results being ordinarily obtainable with unliquefied gases without special precautions, the invention is not limited to use with liquefied gases. Under special conditions, such as extreme cold, other gases may show the troublesome action described above, and in all such cases, these gases are the equivalent of liquefied gases.

We claim:—

1. Process of delivering gas at a substantially uniform low pressure from a container of liquefied gas at high pressure which comprises passing the gas first through a device adapted to deliver at a substantially constant pressure and directly thereafter through a device adapted to reduce gas pressure at a substantially constant ratio.

2. In combination, a gas regulating valve adapted to reduce the pressure of gas delivered to it to a predetermined value, a supply of high-pressure gas connected to said valve, said gas being of such a nature that its flow through said valve is subject to momentary interruptions, a second pressure reducing valve connected directly to the low pressure side of said regulating valve, said second valve being adapted to maintain a substantially constant ratio between the pressures of the gas entering it and that leaving it and a gas-burner connected to the low pressure side of said second valve.

3. Gas welding or cutting apparatus, comprising the combination with a container for liquefied fuel gas, a blowpipe for utilizing fuel gas, and a conduit between said container and said blowpipe, of pressure regulating means in said conduit comprising a pressure reducing and regulating valve adapted to receive gas from said container and to reduce the pressure thereof to a predetermined value and means for dampening the variations of pressure of the gas delivered by said valve, comprising a second pressure reducing valve connected directly to the low pressure side of the first valve and constructed to maintain a substantially constant ratio between the pressures of the gas entering and leaving it.

4. In an apparatus for delivering gas at a substantially uniform low pressure from a container of liquid gas under high pressure consisting of a high pressure regulating and reducing valve having its high pressure side connected to the container; a second non-regulatable pressure reducing valve having a constant reduction ratio; a conduit connecting the low pressure side of the first valve to the high pressure side of the second valve; a pressure gauge graduated to read directly the pressure delivered at the low pressure side of the second valve.

In testimony whereof, we affix our signatures.

MAURICE P. DE MOTTE.
RAYMOND C. PIERCE.